US012725373B2

(12) United States Patent
Baker et al.

(10) Patent No.: US 12,725,373 B2
(45) Date of Patent: Sep. 1, 2026

(54) SYSTEM AND METHOD FOR COORDINATED SYMBOLOGY IN AN AUGMENTED REALITY SYSTEM

(71) Applicant: BAE SYSTEMS PLC, London (GB)

(72) Inventors: Lee Peter Frederick Baker, Rochester (GB); Jason Rodney Garnham, Rochester (GB); Matthew James Rendell, Rochester (GB)

(73) Assignee: BAE SYSTEMS PLC, London (GB)

( * ) Notice: Subject to any disclaimer, the term of this patent is extended or adjusted under 35 U.S.C. 154(b) by 173 days.

(21) Appl. No.: 18/705,141

(22) PCT Filed: Oct. 6, 2022

(86) PCT No.: PCT/GB2022/052527
§ 371 (c)(1),
(2) Date: Apr. 26, 2024

(87) PCT Pub. No.: WO2023/073341
PCT Pub. Date: May 4, 2023

(65) Prior Publication Data
US 2025/0005872 A1 Jan. 2, 2025

(30) Foreign Application Priority Data
Oct. 27, 2021 (EP) .................................... 21275152
Oct. 27, 2021 (GB) .................................... 2115440

(51) Int. Cl.
*G06T 19/00* (2011.01)
*G02B 27/01* (2006.01)

(52) U.S. Cl.
CPC ............ *G06T 19/006* (2013.01); *G02B 27/01* (2013.01)

(58) Field of Classification Search
None
See application file for complete search history.

(56) References Cited

U.S. PATENT DOCUMENTS 6,567,014 B1 * 5/2003 Hansen .................. G01C 23/00 340/975
9,864,194 B2 * 1/2018 Samuthirapandian ...................... G02B 27/017

(Continued)

FOREIGN PATENT DOCUMENTS

EP 3173847 A1 5/2017
WO 2014002347 A1 1/2014

(Continued)

OTHER PUBLICATIONS

International Search Report and Written Opinion received for PCT/GB2022/052527. Mailed: Dec. 19, 2022. 16 pages.

(Continued)

*Primary Examiner* — Martin Mushambo
(74) *Attorney, Agent, or Firm* — Arcane Law PLLC

(57) ABSTRACT

A display system (100) for displaying on a least two different types of display a view of an environment in a real world situation, the system comprising: a first display (200) of a first type; a second display (202) of a second type which is different from the first type; a control system (100, 108) for controlling how information is to be displayed between the first display (200) and the second display (202) and configured to: determine (500) there is available symbology relating to the real world situation; determine (502) a positionally correct location the symbology would occupy if visible; determine (504) that at least one of the first display (200) and the second display (202) are displaying a view that corresponds with the positionally correct location of where the symbology, or portions of the symbology, would occupy if visible; cause (512) the symbology, or portions of the symbology, to be displayed, in the positionally correct location in the at least one of the first display (200) and the second display (202).

19 Claims, 5 Drawing Sheets

(56) References Cited

U.S. PATENT DOCUMENTS

| | | | | |
|---|---|---|---|---|
| 9,977,493 | B2 * | 5/2018 | Lanier | G06F 3/017 |
| 10,120,337 | B2 * | 11/2018 | Maimone | G03H 1/28 |
| 10,586,514 | B2 * | 3/2020 | Shatzki | G02B 27/017 |
| 10,598,932 | B1 * | 3/2020 | Marshall | G06T 11/00 |
| 10,853,014 | B2 * | 12/2020 | George | G06F 3/1423 |
| 11,119,567 | B2 * | 9/2021 | Hamidi-Rad | G06F 3/012 |
| 2010/0287500 | A1 * | 11/2010 | Whitlow | G02B 27/01 715/810 |
| 2014/0313189 | A1 * | 10/2014 | Dominici | G09G 5/02 345/590 |
| 2017/0146797 | A1 * | 5/2017 | Samuthirapandian | G02B 27/0179 |
| 2019/0317718 | A1 * | 10/2019 | George | G06F 3/167 |

FOREIGN PATENT DOCUMENTS

| | | | |
|---|---|---|---|
| WO | 2016204916 | A1 | 12/2016 |
| WO | 2018211494 | A1 | 11/2018 |
| WO | 2023073341 | A1 | 5/2023 |

OTHER PUBLICATIONS

GB Combined Search and Examination Report under Sections 17 and 18(3) received for GB Application No. 2115440.6 Dated: Mar. 15, 2022. 8 pages.

Extended European Search Report received for EP Application No. 21275152.3. Dated: Apr. 8, 2022. 16 pages.

* cited by examiner

SYSTEM AND METHOD FOR COORDINATED SYMBOLOGY IN AN AUGMENTED REALITY SYSTEM

FIELD

The present invention relates to a system and method for coordinating symbology in different display types.

BACKGROUND

There are many circumstances in which symbology can be displayed to assist a user to be more aware of the situation in which the user is located and viewing. Typically, the user may have different types of displays that are used to view different views. This can be particularly relevant to an aircraft pilot. The pilot is required to consider many aspects relating to the situation or environment to ensure accurate and safe manoeuvring on the ground or in the air. The pilot is thus often presented with multiple displays to view both traditional aspects of a view from the cockpit and additional and augmented data and information.

The different displays may be located at different locations and provide different types of information. The pilot is often moving their view from one display to another in order to accurately determine what is occurring in the situation. This can be tiring and visually difficult after many hours of use. In addition, there is also a possibility that the pilot may miss some vital information which may result in risk and damage.

As a result, there is a need to provide a system which enables the pilot to have an enhanced awareness of the situation and environment which is easier to use and less likely to result in accidents, risks or damage.

SUMMARY

According to an aspect of the present invention, there is provided a display system (100) for displaying on at least two different types of display a view of an environment in a real world situation, the system comprising: a first display (200) of a first type; a second display (202) of a second type which is different from the first type; a control system (100, 108) for controlling how information is to be displayed between the first display (200) and the second display (202) and configured to: determine (500) there is available symbology relating to the real world situation; determine (502) a positionally correct location the symbology would occupy if visible; determine (504) that at least one of the first display (200) and the second display (202) are displaying a view that corresponds with the positionally correct location of where the symbology would occupy if visible; cause (512) the symbology to be displayed, in the positionally correct location in the at least one of the first display (200) and the second display (202).

In an aspect, the first display (200) and the second display (202) are juxtaposed and in close proximity of one another.

In an aspect, the symbology is displayed in respective portions between the first display (200) and the second display (202).

In an aspect, the respective portions change as the situation changes maintaining the positionally correct location of the symbology.

In an aspect, the symbology is displayed using respective formatting for the first and second types.

In an aspect, the first display (200) and the second display (202) have different or separate Fields Of View "FOV".

In an aspect, the information for display is received from sensors in the environment associated with the situation.

In an aspect, the information comprises real world data and augmented reality data.

In an aspect, the second display (202) is a Head Down Display "HDD".

In an aspect, the HDD is a Large Area Display.

According to an aspect of the present invention, there is provided a method for displaying on at least two different types of display a view of an environment in a real world situation, the method comprising: determine (500) there is available symbology relating to the real world situation; determine (502) a positionally correct location the symbology would occupy if visible; determine (504) that at least one of a first display (200) and a second display (202) are displaying a view that corresponds with the positionally correct location of where the symbology would occupy if visible; cause (512) the symbology to be displayed in the positionally correct location in the at least one of the first display (200) and the second display (202).

According to an aspect of the present invention, there is provided a computer system configured to cause a processor to perform the method of a previous aspect.

BRIEF DESCRIPTION OF THE FIGURES

Aspects of the invention will now be described by way of example only with reference to the figures, in which.

DETAILED DESCRIPTION

Figure 1:
FIG. 1 is a simplified view of a display system usable in a cockpit of an aircraft showing the position of features in multiple displays, according to the present invention.
Figure 1:
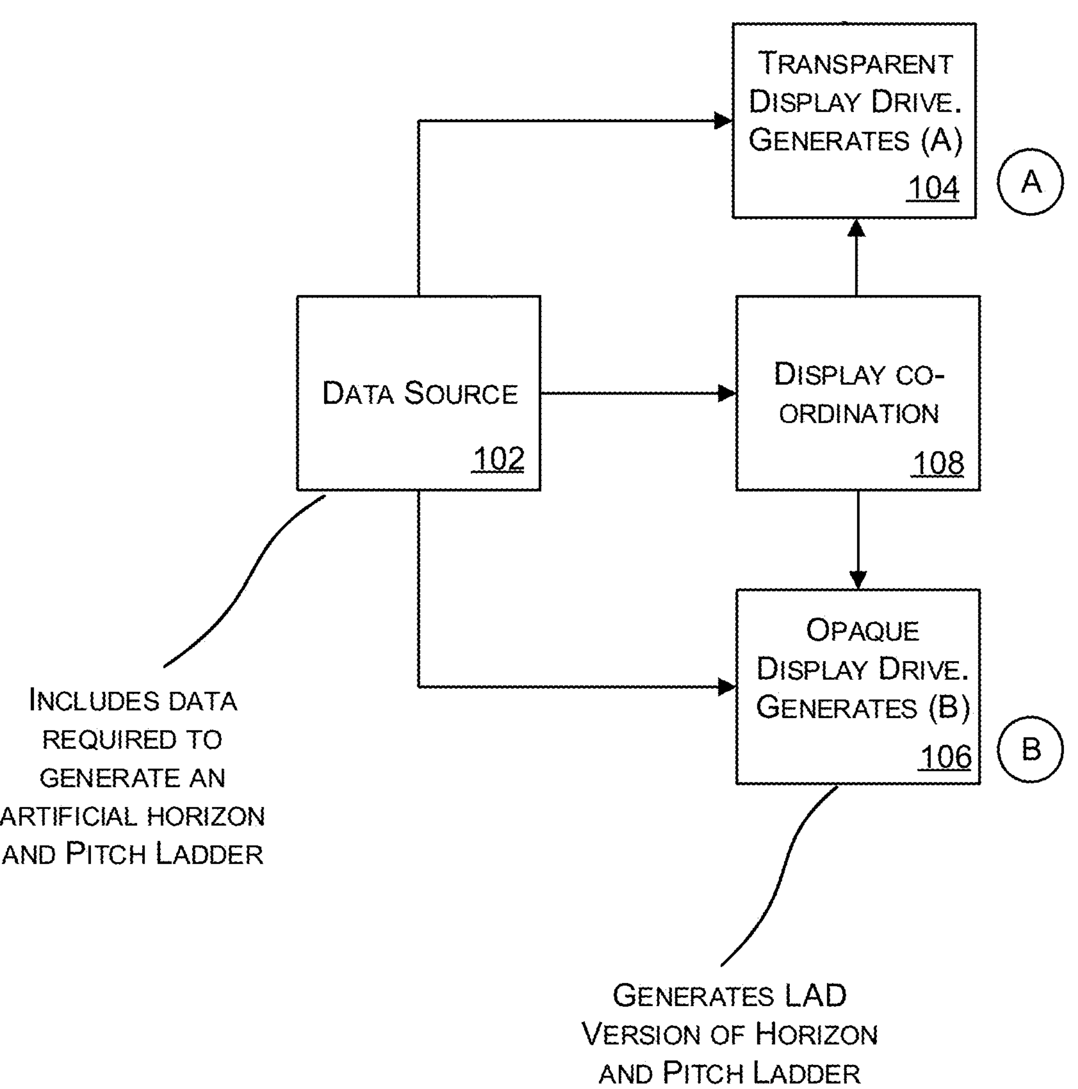

The present invention relates to an improved display system for a vehicle which includes different types of display. Each display displays information including symbology which is often represented differently from one display to another. The present invention relates to a system and method for coordinating the presentation of information and symbology from one display to another without losing the context and position of the information within the field of view (FOV) of the images as viewed by the user of the vehicle. This will result in a greater situational awareness for the user and mitigates user fatigue.

In a typical case a pilot in a cockpit is presented with vast amounts of information to be able to fly an aircraft. The information includes real world information from sensors in the environment or surroundings and from objects and controls in the cockpit in the display FOV. In addition, the pilot is presented with virtual or augmented information associated with the real world, the cockpit, and from many other sources. Information associated with the controls in the cockpit, weather, position etc. is displayed over multiple displays in the cockpit. The multiple displays include a head up display (HUD), a head down display (HDD), a large area display (LAD) or any other display type. Possibilities include advanced (see-through) displays, a Helmet Mounted Display, other forms of see-through, potentially user mounted displays and whole cockpit window display.

An HUD is typically see-through and provides a view of the real world situation. This includes the view through the cockpit window and anything else in the FOV of the HUD. The HUD is augmented by additional information that is generated by the display system and presented in the display. The additional information includes symbology which is displayable on the HUD display. One example of a suitable HUD is the LiteHUD™ produced by BAE Systems.

An HDD is typically opaque and presents additional and/or virtual information to the pilot from the display system. The additional information is typically based on data collected from sensors that are associated with the situation or environment. The HDD can be in the form of large area display (LAD) which includes different regions that are configured to provide a specific type of information, such as weather, direction, position, movement, objects in-and-out of the field of view and anything that enables the pilot to safely manoeuvre the aircraft.

The HUD display is within a limited FOV of the pilot, but this may not be enough for the pilot to fly or drive the aircraft. The HUD FOV covers a small portion of the FOV of the pilot. As the pilot is able to move their head. The present invention expands the limited FOV of the HUD, by extending down into an extra area in the HDD or any other display or display type. The HDD is configured to provide additional information from the sensors to compensate for the limits of the FOV. In this way the pilot has access to a much extended FOV in which real and virtual data is presented.

In general, HUDs and HDDs are fixed relative to the aircraft, for example they could be mounted at a fixed position in the cockpit of the aircraft.

In general, HMDs are fixed to the user and so may move relative to the aircraft.

Both HUD and HDD displays are able to present symbology. However, the nature of the displays and the distance between the displays makes this far from simple and is something the present invention is seeking to address. In addition, the invention further seeks to provide displays that are grouped together in a manner that enables presentation of information between the displays to be continuous across the different displays. (In other words the information is apportioned or split between the plurality of displays as if there were one continuous display. Information outside of the bounds of the displays may not be presented).

Which was not previously been achievable due to the very large gaps between displays and in particular due to the different manners of operation of different displays.

FIG. 1 shows a simplified overview of the display system 100 of the present invention. The system is a computer implemented system including processors, memory, sensors, controllers, peripherals, etc. The system also includes a data module 102, a first display driver 104, a second display driver 106 and a display coordination module 108.

The data module 102 receives data from one or more sensors associated with the situation of the aircraft. The sensors can be of any type, including but not limited to radiation sensors (optical and non-optical), sound sensors, climate sensors, positional sensors, velocity sensors, acceleration sensors, proximity sensors, etc. Data from the sensors is received at the data module where it is processed to produce signals to drive the first and second display drivers 104 and 106 and to control a control system 108 (also referred to as a display coordination module 108). For illustration purposes only, the first and second drivers produce an artificial horizon and a pitch ladder for display (not shown in FIG. 1 but shown in FIG. 2).

Figure 2:
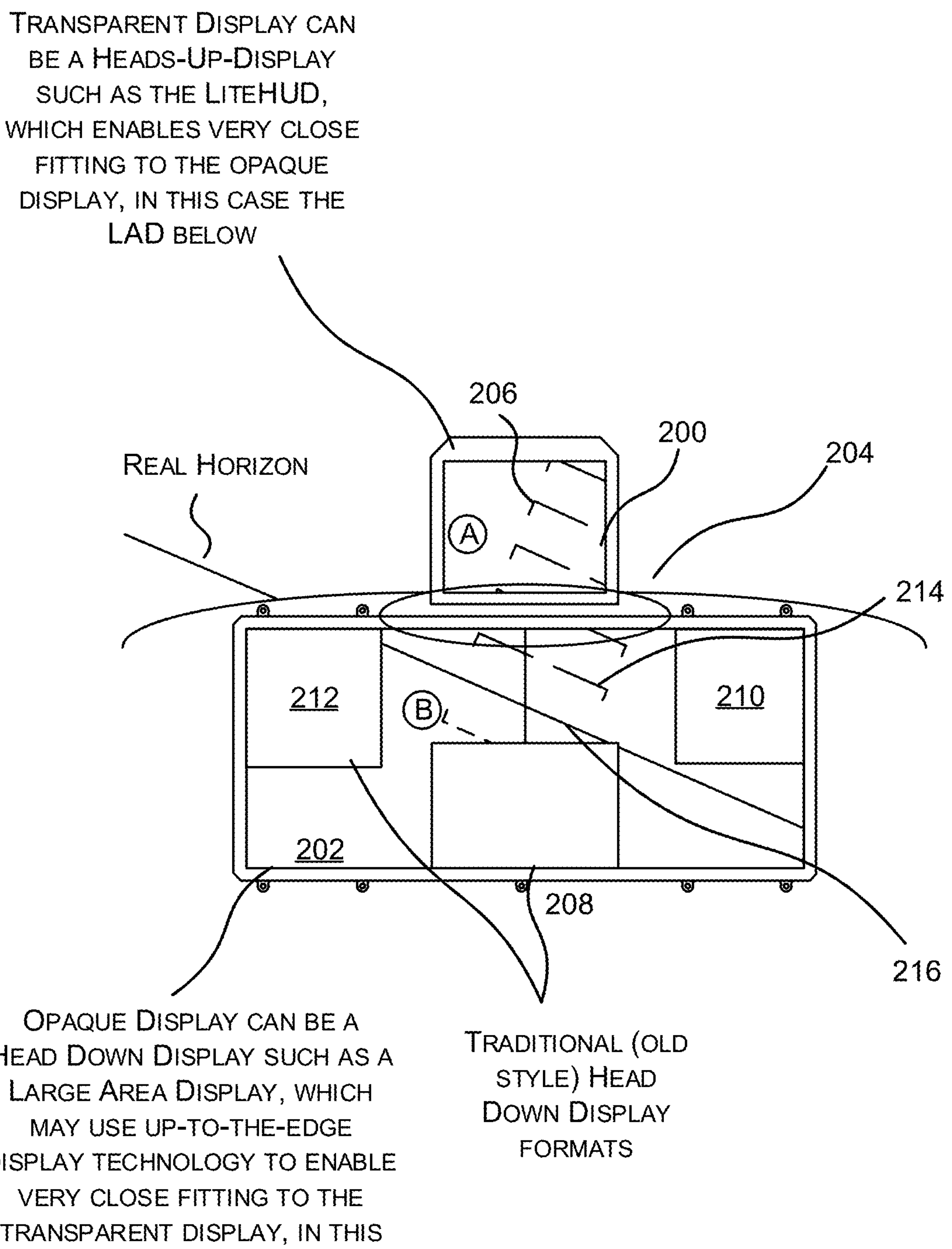
FIG. 2 is a simplified view generated by the display system presenting of FIG. 1.

FIG. 2 shows a combination of an HUD 200 and an HDD 202 as would be viewed by the pilot (not shown). The HUD 200 is positioned above the HDD 202 at a minimal separation 204. It should be noted that the minimal separation is considerably less than in prior art systems due to the nature of the displays. The HUD 200 is driven by the first driver 104 to display content A. At the same time, the second driver 106 causes the HDD 202 to display content B. The display coordination module 108 controls the positioning of some or all of the elements displayed on either the HUD 200 or the HDD 202. The coordination will be described in greater detail below.

Figure 3:
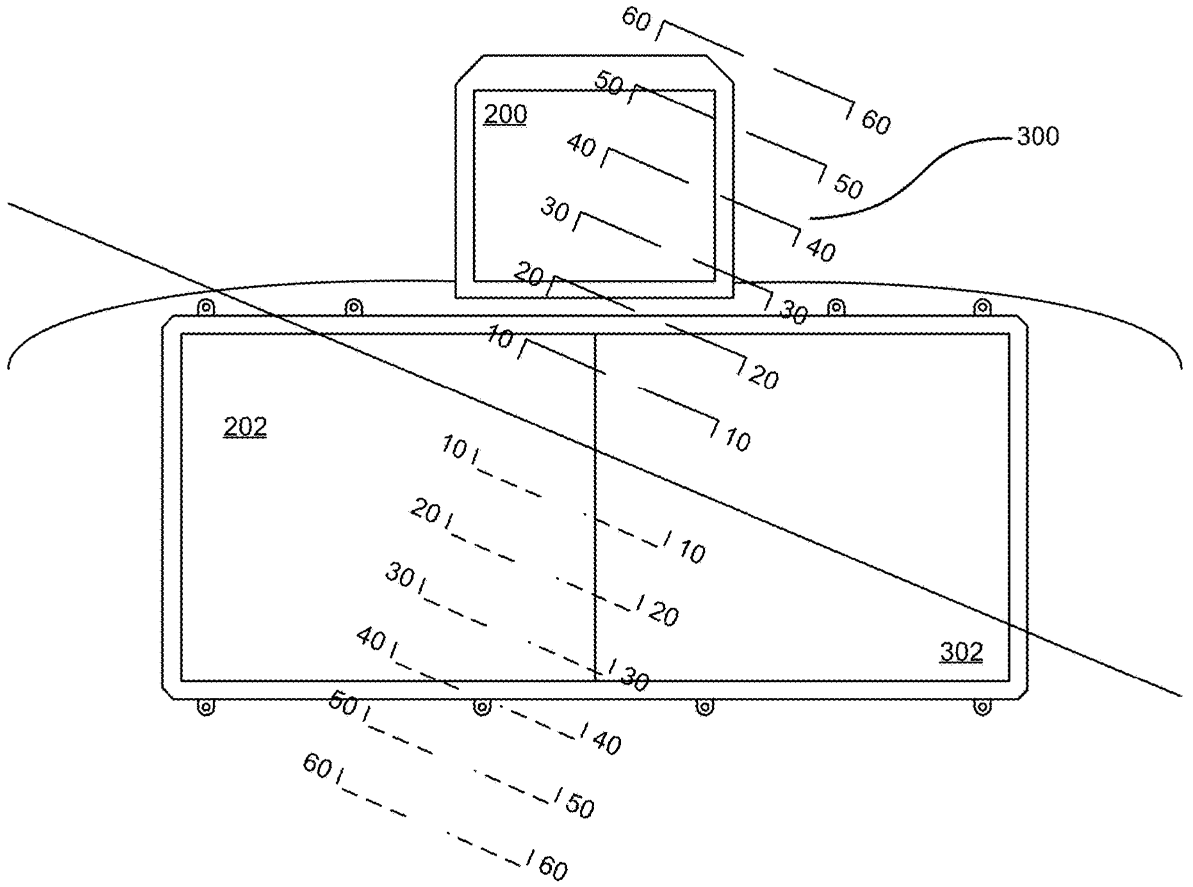
FIG. 3 is a simplified drawing showing symbology for display in multiple displays.

Referring to FIG. 3, the HUD 200 and the HDD 202 are shown with a pitch ladder 300 and an artificial horizon 302. The pitch ladder 300 and the horizon are shown above the displays to show all of their details. (That is to say: the ladder 300 and horizon 302 are shown as symbology continuing beyond the bounds of the displays, to illustrate the continuous symbology to be apportioned between the separate displays).

Figure 4:
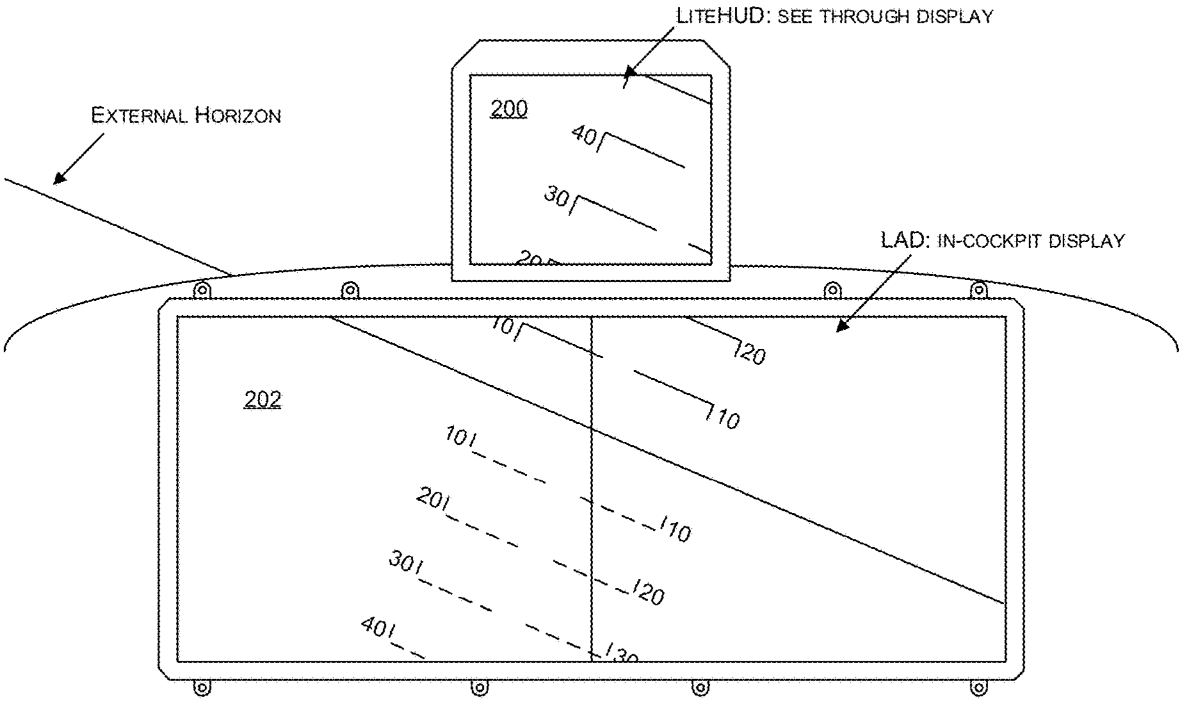
FIG. 4 is a simplified diagram showing how the symbology in FIG. 3 would be viewed by a user.

In accordance with the invention the pitch ladder 300 and artificial horizon 302 would actually be displayed as illustrated in FIG. 4. From FIG. 4, it can be seen that the system maintains the integrity of the pitch ladder and horizon even though they are viewed through different displays which do not necessarily support a common symbology (for example they may not format symbology data in the same way).

Returning to FIG. 2 the details of the view presented to the pilot will now be explained. The HUD 200 is showing content A which includes a first portion 206 of the pitch ladder 300 which is displayed using the HUD symbology under the control of the display coordination module 108. The display coordination module 108 identifies that there is a portion of the pitch ladder that would be in the view of the HUD 200 based on the position thereof as determined by the display system. In response to this the display coordination module 108 causes the relevant portion of the pitch ladder to be displayed on the HUD 200 using the relevant symbology for the first display.

The HDD 202 is showing content B which includes traditional aircraft monitoring system, such as maps 208, navigational aids 210, positional information 212, etc. In addition, there is a second portion of the pitch ladder 214 and a portion 216 of the artificial horizon 302 which is in a position which could be displayed in the HDD 202. The display coordination module 108 enables the presentation of the portion of the pitch ladder 214 and the portion of the artificial horizon 216 to be displayed to be positionally correct using the symbology of the HDD 202.

(Accordingly, and impliedly, there is also provided for a class of content, content C, which is the portion of the symbology (e.g. pitch ladder and artificial horizon) that is not displayed due to its falling outside of the boundaries of the displays. See the bottom, middle, and top right portions of the symbology 300 in FIG. 3.)

Due to the nature of the displays used by the system it is possible for the HUD 200 and HDD 202 to be juxtaposed and in close proximity so that images displayed between the two displays have only a small part of the combined FOV of the two displays that is not covered by one or the other of the displays. The separation between the displays could be any value and depends on the type of display. In an aspect of the invention, a separation of between about 100 mm and 35 mm exists between the two displays ensuring that the missing image data is minimised. As there is only a short displacement between the two displays there is minimal loss of view of the pitch ladder and artificial horizon as indicated in area 204. As a result, the pitch ladder and the artificial horizon are positionally correct and presented in a coordinated manner in the two displays at the same time.

The pitch ladder 300 and horizon 302 have a "correct position" in space relative to the position and orientation of the vehicle in the real world. This correct position is referred to as positionally correct herein. The position of any symbology must be positionally correct to avoid providing misleading information to the pilot. The positioning, orientation and split of the symbology between the two displays is possible for many other types of symbology.

As the aircraft moves the system instantly updates the relative portions of the symbology to ensure integrity between the respective portions and the positionally correct location. The symbology flows from one type of display to the other in real time and represents a positionally correct image of the symbology into the FOV of the pilot. As the pilot manoeuvres the aircraft the pitch ladder and artificial horizon are always positionally correct and displayed in one or both of the first and second display. This ensures that the pilot has an enhanced view of the environment and is accordingly considerably more aware of the situation.

Figure 5:
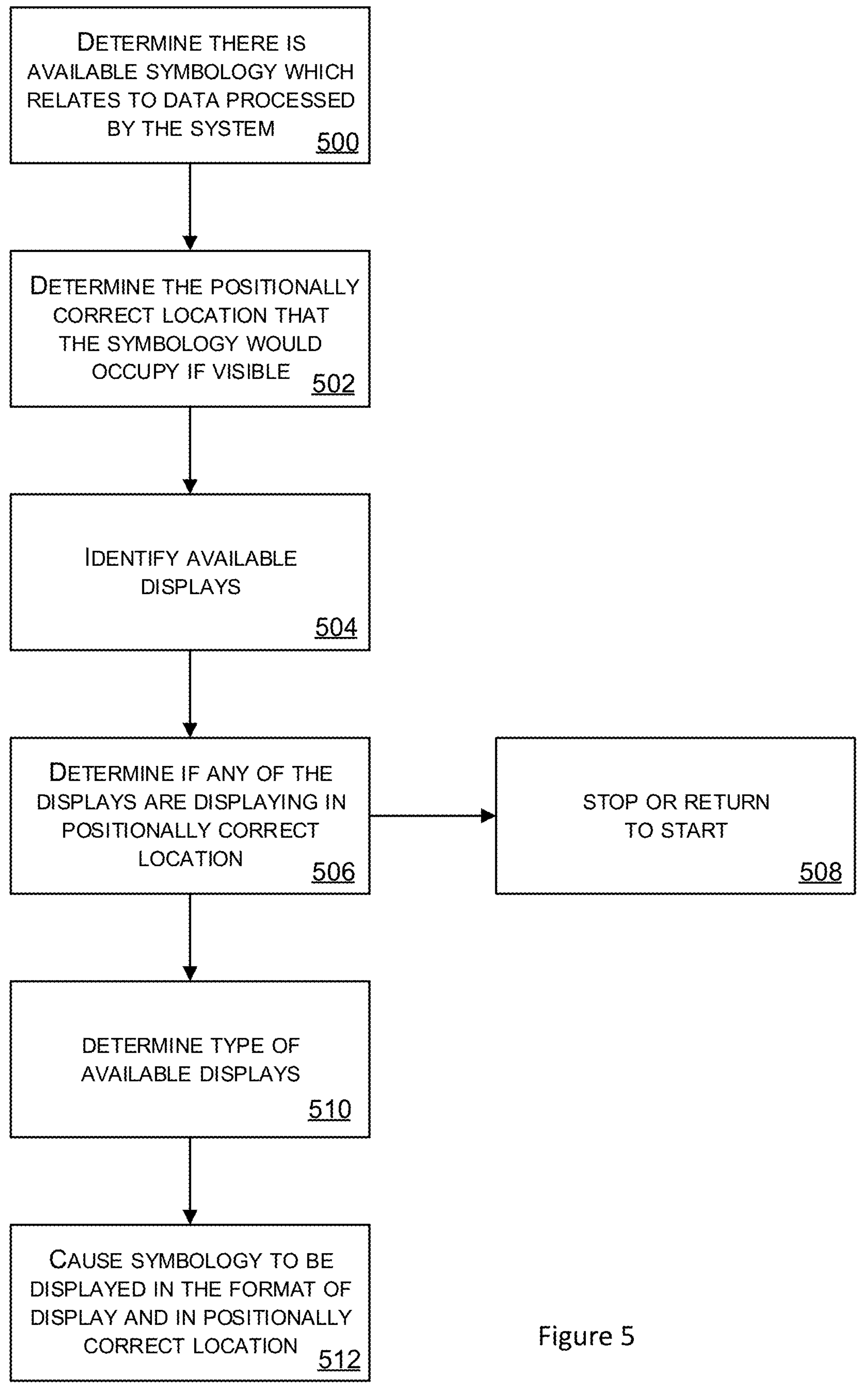
FIG. 5 is a flow chart of how the symbology is generated and displayed between the multiple displays.

The display coordination module 108 operates as described with reference to FIG. 5. In a first step 500 the display coordination module 108 determines that there is available symbology which relates to data processed by the system. The display coordination module 108 determines the positionally correct location that the symbology would occupy if visible in step 502. The display coordination module 108 identifies the available displays in step 504. The display coordination module 108 determines, in step 506, if any of the displays are displaying in positionally correct location of where the symbology should be. (Or in other words, determining if there is a display corresponding with positionally correct symbology). If no, the process returns to the start or stops 508. If yes, the display coordination module 108 determines the type of display 510. In step 512, the display coordination module 108 causes the symbology to be displayed, in the format of the type of display and in positionally correct location.

The present invention is described with reference to a pilot operating an aircraft. It will be appreciated that the display system could be adapted to any combination of display types and for other applications than operating an aircraft. For example, the invention could be configured for other moveable platforms such as automobiles or watercraft.

The invention has been described using two types of display, it will be appreciated there is no reason for this to be a limit and further displays may be added as appropriate. It is envisaged that at least one of the displays could be in the form of a wearable display, such as a Head Worn Display (HWD).

The invention is implemented using computing systems such as, a desktop, laptop or notebook computer, hand-held computing device (PDA, cell phone, palmtop, etc.), mainframe, server, client, or any other type of special or general purpose computing device as may be desirable or appropriate for a given application or environment can be used. The computing system can include one or more processors which can be implemented using a general or special-purpose processing engine such as, for example, a microprocessor, microcontroller or other control module.

The computing system can also include a main memory, such as random access memory (RAM) or other dynamic memory, for storing information and instructions to be executed by a processor. Such a main memory also may be used for storing temporary variables or other intermediate information during execution of instructions to be executed by the processor. The computing system may likewise include a read only memory (ROM) or other static storage device for storing static information and instructions for a processor.

The computing system may also include an information storage system which may include, for example, a media drive and a removable storage interface. The media drive may include a drive or other mechanism to support fixed or removable storage media, such as a hard disk drive, a floppy disk drive, a magnetic tape drive, an optical disk drive, a compact disc (CD) or digital video drive (DVD) read or write drive (R or RW), or other removable or fixed media drive. Storage media may include, for example, a hard disk, floppy disk, magnetic tape, optical disk, CD or DVD, or other fixed or removable medium that is read by and written to by media drive. The storage media may include a computer-readable storage medium having particular computer software or data stored therein.

In alternative aspects, an information storage system may include other similar components for allowing computer programs or other instructions or data to be loaded into the computing system. Such components may include, for example, a removable storage unit and an interface, such as a program cartridge and cartridge interface, a removable memory (for example, a flash memory or other removable memory module) and memory slot, and other removable storage units and interfaces that allow software and data to be transferred from the removable storage unit to computing system.

The computing system can also include a communications interface. Such a communications interface can be used to allow software and data to be transferred between a computing system and external devices. Examples of communications interfaces can include a modem, a network interface (such as an Ethernet or other NIC card), a communications port (such as for example, a universal serial bus (USB) port), a PCMCIA slot and card, etc. Software and data transferred via a communications interface are in the form of signals which can be electronic, electromagnetic, and optical or other signals capable of being received by a communications interface medium.

In this document, the terms 'computer program product', 'computer-readable medium' and the like may be used generally to refer to tangible media such as, for example, a memory, storage device, or storage unit. These and other forms of computer-readable media may store one or more instructions for use by the processor comprising the computer system to cause the processor to perform specified operations. Such instructions, generally referred to as 'computer program code' (which may be grouped in the form of computer programs or other groupings), when executed, enable the computing system to perform functions of aspects of the present invention. Note that the code may directly cause a processor to perform specified operations, be compiled to do so, and/or be combined with other software, hardware, and/or firmware elements (e.g., libraries for performing standard functions) to do so.

The non-transitory computer readable medium may comprise at least one from a group consisting of: a hard disk, a CD-ROM, an optical storage device, a magnetic storage device, a Read Only Memory, a Programmable Read Only Memory, an Erasable Programmable Read Only Memory, EPROM, an Electrically Erasable Programmable Read Only Memory and a Flash memory In an aspect where the elements are implemented using software, the software may be stored in a computer-readable medium and loaded into computing system using, for example, removable storage drive. A control module (in this example, software instructions or executable computer program code), when executed by the processor in the computer system, causes a processor to perform the functions of the invention as described herein.

Furthermore, the inventive concept can be applied to any circuit for performing signal processing functionality within a network element. It is further envisaged that, for example, a semiconductor manufacturer may employ the inventive concept in a design of a stand-alone device, such as a microcontroller of a digital signal processor (DSP), or application-specific integrated circuit (ASIC) and/or any other sub-system element.

It will be appreciated that, for clarity purposes, the above description has described aspects of the invention with reference to a single processing logic. However, the inventive concept may equally be implemented by way of a plurality of different functional units and processors to provide the signal processing functionality. Thus, references to specific functional units are only to be seen as references to suitable means for providing the described functionality, rather than indicative of a strict logical or physical structure or organisation.

Aspects of the invention may be implemented in any suitable form including hardware, software, firmware or any combination of these. The invention may optionally be implemented, at least partly, as computer software running on one or more data processors and/or digital signal processors or configurable module components such as FPGA devices. Thus, the elements and components of an aspect of the invention may be physically, functionally and logically implemented in any suitable way. Indeed, the functionality may be implemented in a single unit, in a plurality of units or as part of other functional units.

Although the present invention has been described in connection with some aspects, it is not intended to be limited to the specific form set forth herein. Rather, the scope of the present invention is limited only by the accompanying claims. Additionally, although a feature may appear to be described in connection with particular aspects, one skilled in the art would recognize that various features of the described aspects may be combined in accordance with the invention. In the claims, the term 'comprising' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

The invention claimed is:

1. A display system for displaying on at least two different displays a view of an environment in a real world situation, the system comprising:
- a first display;
- a second display separate from the first display; and
- a control system for controlling how information is to be displayed between the first display and the second display and configured to
  - determine there is symbology relating to the real world situation,
  - determine a positionally correct location the symbology would occupy if a first portion of the symbology and a second portion of the symbology are split between the first display and the second display, respectively,
  - determine that a combination of the first display and the second display are displaying a view that corresponds with the positionally correct location of where the first portion of the symbology would occupy if visible within a first bounds of the first display and where the second portion of the symbology would occupy if visible within a second bounds of the second display, and
  - cause the first portion of the symbology to be displayed in the positionally correct location in the first display and the second portion of the symbology to be displayed in the positionally correct location in the second display.

2. The display system according to claim 1, wherein the first bounds of the first display and the second bounds of the second display are non-overlapping.

3. The display system according to claim 1, wherein the respective first and second portions of the symbology change as the real world situation changes maintaining the positionally correct location of the symbology.

4. The display system according to claim 1, wherein the symbology is displayed using respective formatting for the first and second displays.

5. The display system according to claim 1, wherein the first display and the second display have different fields of view.

6. The display system according to claim 1, wherein the first display and the second display have separate fields of view.

7. The display system according to claim 1, wherein the information for display is received from sensors in the environment associated with the real world situation.

8. The display system according to claim 1, wherein the information comprises real world data and augmented reality data.

9. The display system according to claim 1, wherein the first display is a head up display (HUD).

10. The display system according to claim 9, wherein the second display is a head down display (HDD).

11. The display system according to claim 10, wherein the HDD is a large area display.

12. A method for displaying on at least two separate displays a view of an environment in a real world situation, the method comprising:
- determine there is symbology relating to the real world situation;
- determine a positionally correct location the symbology would occupy if a first portion of the symbology and a second portion of the symbology are split between a first display and a second display, respectively;
- determine that a combination of the first display and the second display are displaying a view that corresponds with the positionally correct location of where the first portion of the symbology would occupy if visible within a first bounds of the first display and where the second portion of the symbology would occupy if visible within a second bounds of the second display; and
- cause the first portion of the symbology to be displayed in the positionally correct location in the first display and the second portion of the symbology to be displayed in the positionally correct location in the second display, wherein the second display is separate from the first display.

13. The method according to claim 12, the first bounds of the first display and the second bounds of the second display are non-overlapping.

14. A computer program product including instructions encoded on one or more non-transitory machine-readable mediums that when executed by one or more processors cause a process to be carried out for displaying on at least two separate displays a view of an environment in a real world situation, the process comprising:

determine there is symbology relating to the real world situation;

determine a positionally correct location the symbology would occupy if a first portion of the symbology and a second portion of the symbology are split between a first display and a second display, respectively;

determine that a combination of the first display and the second display are displaying a view that corresponds with the positionally correct location of where the first portion of the symbology would occupy if visible within a first bounds of the first display and where the second portion of the symbology would occupy if visible within a second bounds of the second display; and cause the first portion of the symbology to be displayed in the positionally correct location in the first display and the second portion of the symbology to be displayed in the positionally correct location in the second display, wherein the second display is separate from the first display.

15. The computer program product according to claim 14, wherein the symbology is displayed in respective portions between the first display and the second display.

16. The computer program product according to claim 15, wherein the respective portions change as the real world situation changes maintaining the positionally correct location of the symbology.

17. The computer program product according to claim 14, wherein the symbology is displayed using respective formatting for the first and second displays.

18. The computer program product according to claim 14, wherein the information comprises real world data and augmented reality data.

19. A system comprising:

the computer program product according to claim 14;

the first display; and the second display;

wherein the first display is a head up display (HUD) and the second display is a head down display (HDD);

wherein the first display and the second display have different or separate fields of view; and the information for display is received from sensors in the environment associated with the real world situation.

* * * * *